United States Patent
Lavoignat

(10) Patent No.: US 11,314,934 B1
(45) Date of Patent: Apr. 26, 2022

(54) SMART PUSH OF VALUES IN SPREADSHEETS

(71) Applicant: SAP SE, Walldorf (DE)

(72) Inventor: Sebastien Lavoignat, Droue sur Drouette (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/113,977

(22) Filed: Dec. 7, 2020

(51) Int. Cl.
*G06F 40/18* (2020.01)
*G06F 16/22* (2019.01)

(52) U.S. Cl.
CPC .......... *G06F 40/18* (2020.01); *G06F 16/2264* (2019.01)

(58) Field of Classification Search
None
See application file for complete search history.

(56) References Cited

U.S. PATENT DOCUMENTS

| | | | | |
|---|---|---|---|---|
| 7,143,338 B2* | 11/2006 | Bauchot | .................. | G06F 40/18 715/212 |
| 2006/0080596 A1* | 4/2006 | Bhogal | .................. | G06F 9/542 715/213 |
| 2007/0055922 A1* | 3/2007 | Martynov | ............. | G06F 40/274 715/210 |
| 2008/0243763 A1* | 10/2008 | Bishop | .................... | G06F 40/18 |
| 2008/0244377 A1* | 10/2008 | Erwig | ..................... | G06F 40/18 715/212 |
| 2009/0031206 A1* | 1/2009 | Aureglia | ................. | G06F 40/18 715/217 |
| 2009/0319542 A1* | 12/2009 | Le Brazidec | ........... | G06F 40/18 |
| 2010/0257439 A1* | 10/2010 | Xue | ........................ | G06F 40/18 715/217 |
| 2011/0016379 A1* | 1/2011 | McColl | ................... | G06F 40/18 715/219 |
| 2014/0059085 A1* | 2/2014 | Schreck | ................ | G06F 16/258 707/801 |
| 2014/0372851 A1* | 12/2014 | Rutherford | ............. | G06F 40/18 715/212 |
| 2016/0055139 A1* | 2/2016 | Creason | .................. | G06F 40/18 715/217 |
| 2016/0147804 A1* | 5/2016 | Wein | ..................... | G06F 16/283 707/600 |
| 2020/0081968 A1* | 3/2020 | Flisakowski | ............ | G06F 40/18 |
| 2021/0303473 A1* | 9/2021 | Stewart | .................. | G06F 3/0482 |

OTHER PUBLICATIONS

Martin Hawksey, Google Apps Script Patterns: Writing rows of data to Google Sheets, Feb. 21, 2018, MASHe (Year: 2018).*

* cited by examiner

*Primary Examiner* — Howard Cortes
(74) *Attorney, Agent, or Firm* — Buckley, Maschoff & Talwalkar LLC

(57) ABSTRACT

Various embodiments of systems, computer program products, and methods to smart push values in spreadsheet instances are described herein. In an aspect, a spreadsheet instance is activated to receive at least one value, pushed within a process automation execution. The size of the data is calculated, including its dimensions. In another aspect, an active cell in the activated spreadsheet instance is determined. The active cell marks the position where the data will be entered, based on its size as determined, and further based on the orientation of the dimensions of the data. In yet another aspect, a new position of the active cell is calculated based on the data size. The cell at the position corresponding to the calculated new position is set as the new active cell of the spreadsheet instance.

20 Claims, 8 Drawing Sheets

|   | A | B | C | D | E | F | G | H | I |
|---|---|---|---|---|---|---|---|---|---|
| 1 | 410 | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |

SHEET 1

|   | A | B | C | D | E | F | G | H | I |
|---|---|---|---|---|---|---|---|---|---|
| 1 | EMPLEE | AGE | STATE | | | | | | |
| 2 | NAME1 | 25 | FR | | | | | | |
| 3 | NAME2 | 31 | US | | | | | | |
| 4 | NAME3 | 46 | DE | | | | | | |
| 5 | 510 | | | | | | | | |
| 6 | | | | | | | | | |
| 7 | | | | | | | | | |
| 8 | | | | | | | | | |

SHEET 1

SMART PUSH OF VALUES IN SPREADSHEETS

BACKGROUND

Robotic process automation (RPA) is used successfully to automate various processes and/or operations, executed manually in computer environments. Similar to mechanical robotics, RPA increases the efficiency and precision in the execution of a variety of tasks related to business processes. Often, the automated tasks are related to repetitive activities performed in popular computer applications. For example, the office applications (e.g., applications such as email, word processor, spreadsheet, etc.) are the everyday tools used in almost every business process. Accordingly, RPA solutions often target this kind of applications, to providing time saving and improved services.

Spreadsheet applications and tools, such as Microsoft® Excel®, are vastly used for collecting, accessing, structuring, analyzing, presenting, etc., business related data. Typically, such usage involves numerous repetitive tasks that could be automated. However, the sophistication of spreadsheet applications leads to fairly complex RPA solutions for automation of even simple activities, such as writing and/or reading of data in spreadsheets. Therefore, the design and the implementation of spreadsheet automations become cumbersome, requiring deeper knowledge about the spreadsheet applications and involving developer's skills.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

FIG. 4 illustrates a blank spreadsheet instance, according to one embodiment.

FIG. 5 illustrates a spreadsheet instance after writing in data, according to one embodiment.

FIG. 9 illustrates spreadsheet instances of a spreadsheet where data is separately written, according to one embodiment.

DETAILED DESCRIPTION

Embodiments of techniques to smart push values in spreadsheets are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
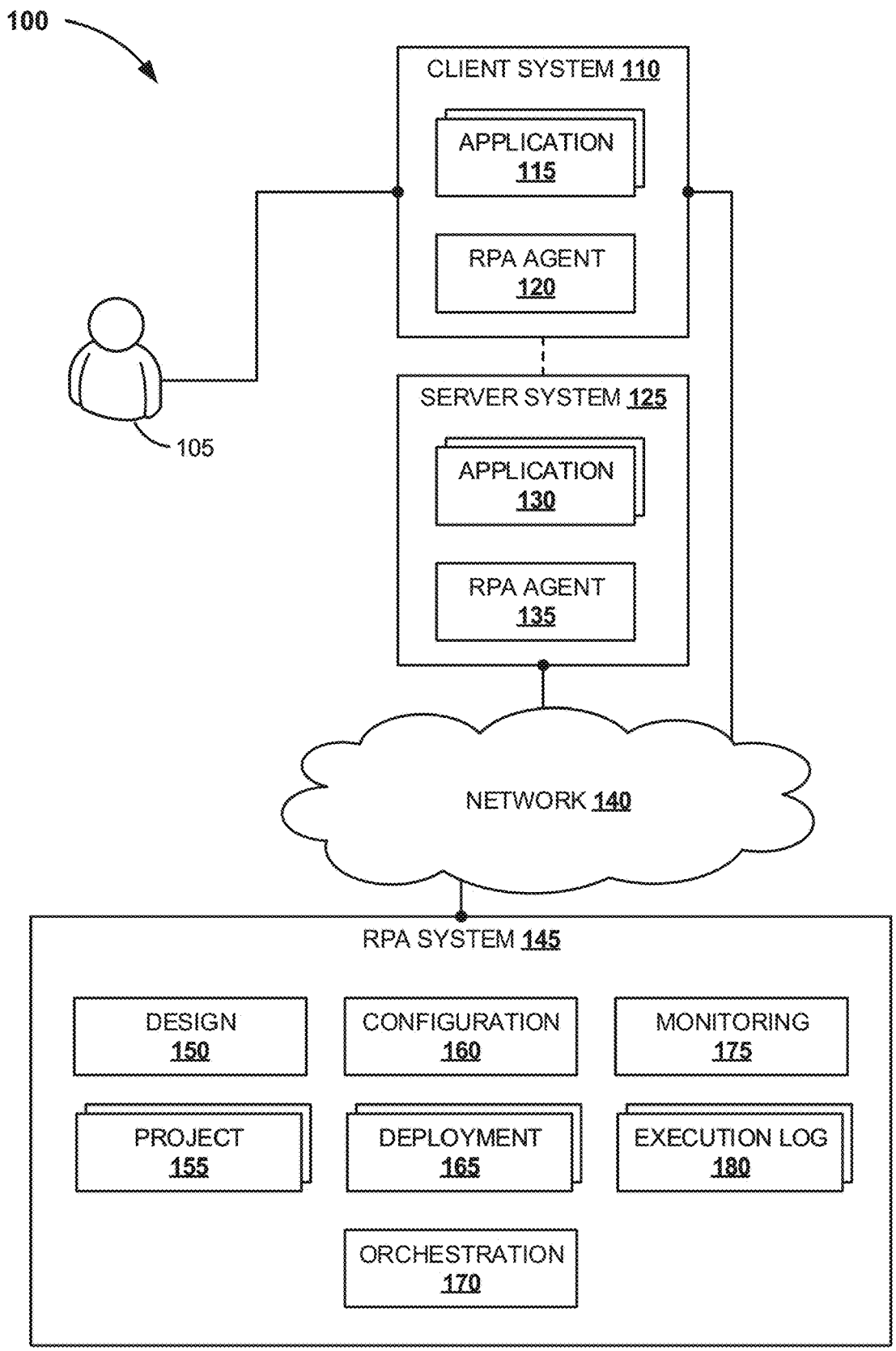
FIG. 1 is a block diagram illustrating a system that implements an RPA solution, according to one embodiment.

FIG. 1 shows exemplary system 100, that may be used to implement an RPA solution in accordance with the description. In one embodiment, client system 110 provides environment for accessing various applications 115, including a spreadsheet application. For example, such applications may be installed and run locally, or accessed via client interface, e.g., a web browser (not illustrated). A user (e.g., 105) may access the spreadsheet application (115) at client system 110 to perform various tasks, some of which can be automated with an RPA solution, according to one embodiment. Similarly, server system 125 may provide environment for executing or accessing applications 130, including a spreadsheet application, where various activities may be automated with the help of an RPA solution, according to one embodiment.

RPA system 145 represents basic modules of an RPA framework accessible via public or/and private network (e.g., 140), that can be used to automate the execution of activities at client system 110 and/or at server system 125, according to one embodiment. The modules of RPA system 145, as illustrated, are broadly based on Intelligent RPA® product provided by SAP SE company. In Intelligent RPA (IRPA), RPA system 145 is implemented in SAP Cloud Platform®, and called "Factory" (e.g., IRPA Factory®). Other embodiments may be based on other products or systems that implement similar or different modules for developing and/or implementing RPA solutions.

In one embodiment, design 150 provides development environment (e.g., design studio) for users (e.g., 105) to create projects (155) that may include different automations of activities within business processes. Generally, one project (e.g., 155) may involve activities performed on one or more client systems (e.g., 110) or/and one or more server systems (e.g., 125). These activities combined in a project may form an automation flow, also referred to as a package, when compiled. The package may be further configured (e.g., at 160) and deployed (e.g., at 165). In one embodiment, configuration 160 may define runtime and recurrences, target systems for execution, various execution parameters, such as credentials, etc., pertinent to deployment 165. In one embodiment configuration is managed or accessed by a user (e.g., 105) with special privileges (e.g., managers, IRPA Factory administrators, etc.).

Automation flows that are configured (e.g., at 160) and deployed (e.g., at 165), may be orchestrated (e.g., at orchestration 170) and directed to respective target system/s (e.g., server system/s 125 and/or client system/s 110), e.g., for execution. In one embodiment, automation flow/s are executed via RPA agent/s (e.g., 120 and/of 135) at application/s (e.g., 115 and/or 130, respectively). A hierarchy of registered RPA agents may be defined (e.g., by configuration 160 at deployment 165) to execute particular package/s. In other words, orchestration 170 may facilitate the delivery of automated activities or jobs to the involved client or server computer systems. The jobs delivery and execution may be logged (e.g., at 180) and monitored (e.g., at 175) by interested stakeholders (e.g., user 105).

Figure 2:
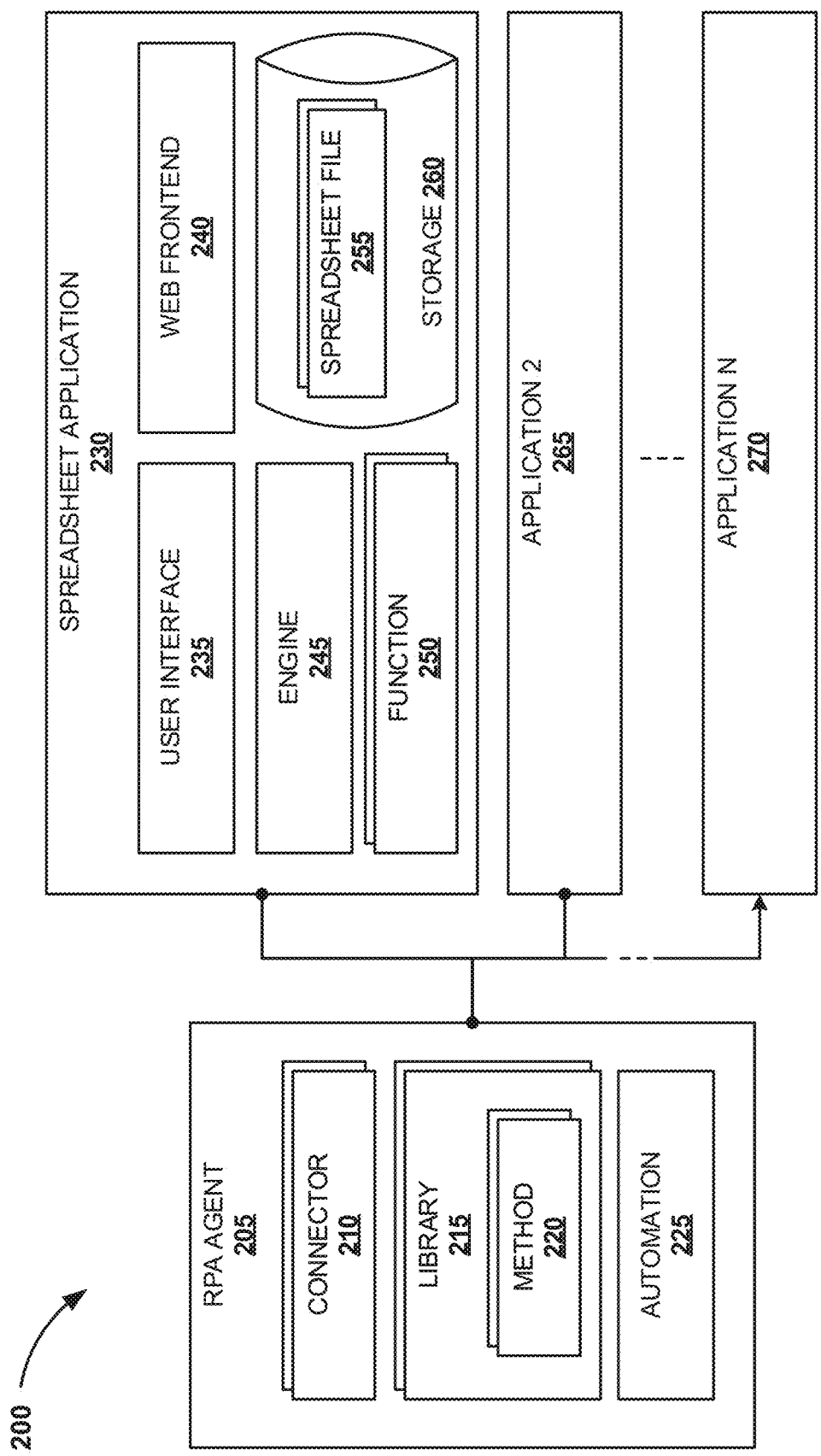
FIG. 2 is a block diagram illustrating modules in a computer system, including an RPA agent, according to one embodiment.

In one embodiment, RPA agents (e.g., 120, 135) are programs installed and run at the computer systems where the automation will be executed (e.g., 110, 125). Based on configuration 160 and deployment 165, and via orchestration 170, agents 120 and 135 may receive or pull automation flow/s as compiled to be executed over one or more applications at the respective computer systems (110 and 125). FIG. 2 shows RPA agent 205 in combination with running applications (230, and 265 to 270) at computer system 200 (not further detailed), according to one embodiment. RPA agent 205 may handle automated execution of activities by one or more of the applications (230, and 265 to 270), according to the automation flows designed and distributed via the RPA system (e.g., RPA system 145 of FIG. 1).

As illustrated in FIG. 2, RPA agent 205 includes at least one connector 210 to interact with different application technologies (e.g., relevant to applications 230, and 265 to 270). Further, RPA agent 205 includes at least one library 215 with at least one method 220 to interact with applications (e.g., 230, and 265 to 270). In one embodiment, automation 225 of RPA agent 205 stores the activities as designed (e.g., at RPA system 145, FIG. 1) to be executed at one or more of the applications (e.g., 230, and 265 to 270). In one embodiment, RPA agent 205 triggers and manages the execution of the automation scenario as uploaded at automation 225, e.g., in either attended or unattended mode. The execution of the RPA agent may be managed and/or monitored by the corresponding RPA system (e.g., 145, FIG. 1) via an established connection (not illustrated in FIG. 2).

In one embodiment, application 230 is a spreadsheet application. FIG. 2 shows a basic structure of spreadsheet application 230 including user interface 235 and/or web frontend 240 (e.g., to provide user access via a browser when computer system 200 is a server). Spreadsheet application 230 may keep spreadsheet files 255 at storage 260, e.g., internally or outside system 200, or both. Functions 250 represent the built-in or user defined functionality available at spreadsheet application 230 to read, write and process data in spreadsheets, e.g., stored in files 255. Engine 245 may provide environment, e.g., calculation services, etc., for executing functions 250. Users may access the spreadsheets (e.g., 255) via user interface 235 and/or web frontend 240 to directly perform desired operations. For example, user actions at user interface 235 or received at web frontend 240 may result to application programming interface (API) calls to execute functions (250) at engine 245.

In one embodiment, RPA agent 205 may perform various activities at spreadsheet application 230, according to a scenario or automation flow (automation 225), e.g., instead of a user. For example, one or more methods (220), e.g., referred by automation 225, may translate to respective API calls at spreadsheet application 230, e.g., via connector 210. In one embodiment, RPA agent may trigger activities, such as starting spreadsheet application 230 creating and/or opening spreadsheet file 255, writing and/or reading data in spreadsheet file 255, etc.

An RPA system, e.g., coherent with the implementations illustrated in FIG. 1 and FIG. 2, may provide a robust framework for definition and execution of automation flows.

The design of automations depends on the functionalities of the applications where the automated activities would take place. Often, even simple tasks may involve handling variables that may result in complicated designs, prone to inefficiencies and errors. Thus, the straightforward task of writing values in spreadsheet cells may require maintaining coordinates of cells where values should be written.

Common automation scenarios may include writing series of values in one or more spreadsheet instances. For example, values may be provided by a customer as arguments, e.g., depending on other processes. Accordingly, there could be numerous calls of one or more spreadsheet instances to push values to form one or more structured data entities (e.g., lists, matrices, etc.). The exact number of calls and the format of the values to be stored may be unknown as they could depend on other processes. Normally, with each call to place a value, spreadsheet applications require the position of the cell in the spreadsheet instance where the value should be placed. Therefore, an automation to push values in a spreadsheet should be designed to maintain the positions of the cells in one or more spreadsheet instances.

Figure 3:
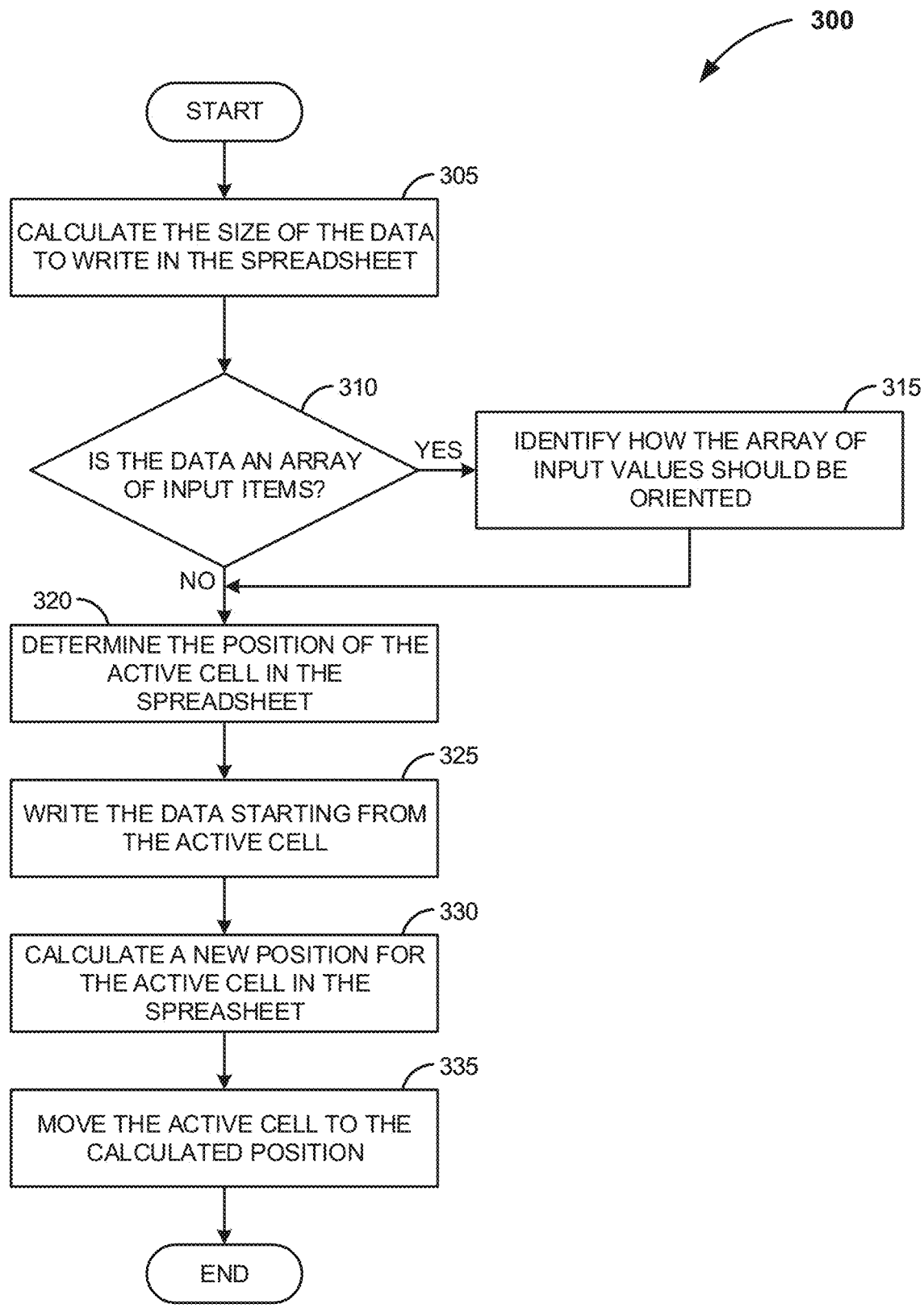
FIG. 3 is a flow diagram illustrating a process to push values in cells of a spreadsheet, according to one embodiment.

Storing data in spreadsheets is one of the most frequently automated operations by RPA solutions. Maintaining multiple variables to account for the positions of the relevant cells in multiple spreadsheet files and instances proves to be a difficult and cumbersome task, engaging a lot of development efforts. FIG. 3 shows process 300 to push values in cells of a spreadsheet instance without maintaining the position of the cells, according to one embodiment.

Process 300 begins with calculating the size of the data to be written in the spreadsheet instance, at 305. In one embodiment, process 300 may correspond to a function in an automated flow package executed by an RPA agent at a client or server system. In one embodiment, such a function corresponds to an API invoked by the RPA agent. The data to be written could be provided as an argument in process 300 (e.g., argument to a function or method), and may have different structure. For example, the data to be written may be a single value or a series of values to be placed in series of cells. The series of values may be one dimensional (e.g., array) or two dimensional (e.g., matrix). Further, the values may be of different types, e.g., String, Boolean, Number, that may affect the calculation of the size.

The writing of one-dimensional series of data may require an identification whether the values of the array should be written in separate cells on the same row, or in separate cells on the same column. Accordingly, at 310, it is checked whether the data submitted for writing in the spreadsheet instance is an array of values, and when yes, it is identified how the array of input values should be oriented, at 315. The determination of the size of the data to be written, including its dimensions and orientation may identify the structure of cells where the values will be written. In one embodiment, instead of specifying the position of each cell where a value should be written, process 300 writes values in a group of relatively positioned cells starting from the currently active cell in the spreadsheet instance (325) and following the identified structure of the data. Thus, subsequent values, e.g., of an array, are pushed in subsequent cells, e.g., on a row or on a column. The position of the active cell in the spreadsheet instance could be initially determined at 320.

At 330, a new position is calculated for the active cell in the spreadsheet instance, and at 335, the active cell is moved to the new position. In other words, the cell at the calculated new position is set as active cell. In one embodiment, at a given time, there can be only one cell that is set or marked as active (e.g., active cell) per spreadsheet instance. The new position of the active cell determines the position where a first new value will be written in another execution, e.g., instance, of process 300. In one embodiment, process 300 allows automated data entry without separately maintaining the positions of the cells per spreadsheet instances (e.g., by setting and managing global variables). In one embodiment, process 300 takes advantage of the properties of the spreadsheet applications (e.g., 230 in FIG. 2) that keep the positions of the active cells per spreadsheet instances (e.g., in spreadsheet file 255), even when a spreadsheet is not active.

In one embodiment, the calculation of the new position of the active cell at 330 is based on the size (e.g., the types and/or the dimensions) of the data written in the spreadsheet instance. Further, the calculation of the new position of the active cell at 330 may involve additional factors that may offset the new position of the active cell, e.g., empty rows and/or columns to be left before a new value is written in the same spreadsheet instance (e.g., during a subsequent execution of process 300). The additional factors may be submitted as arguments or parameters of a function or a method implementing process 300, e.g., in an automated flow. For example, one or more rows and/or columns may be left blank to insert aggregated data, e.g., manually, or by another function/method.

FIG. 4 illustrates blank spreadsheet instance 400 where values should be inserted, e.g. by process 300 of FIG. 3, according to one embodiment. For example, a function, e.g., named "Push Values On Row", that implements process 300 may be called repeatedly with arguments as follows:

First call: ["Emplee", "Age", "State"];
Second call: ["Name1", 25, "FR"];
Third call: [["Name2", 31, "US"], ["Name3",46, "DE"]];

With each call, the function calculates the size of the data to be pushed in spreadsheet 400, the cells involved, and the new position of the active cell, e.g., based on process 300 in FIG. 3. The example shows that the data provided as input for the first two calls represent arrays. In one embodiment, the orientation of the arrays may be defined by an adopted convention, e.g., involving special symbols. For example, the separate values provided in square brackets may be placed in separate cells on the same row. The data submitted for writing with the third call represents a matrix of two separate arrays.

It should be noted that in the present example, the values as provided are placed in the same number of columns. However, this may not be mandatory. The function "Push Values On Row" can support values with various sizes and varying number of values about rows and columns, e.g., both, provided together and/or with different calls.

As illustrated in FIG. 4, the initial active cell 410 is at position A1. Each call of the function ("Push Values On Row") will write the submitted values starting from the currently active cell, and afterwards will calculate and move the active cell at a new starting position. FIG. 5 illustrates spreadsheet instance 500 that represents spreadsheet instance 400 of FIG. 4 after writing in the data submitted with the exemplary calls of the function (e.g., "Push Values On Row"). According to one embodiment, the currently active cell 510 in spreadsheet instance 500 is position at A5 after the execution of the third call.

Figure 6:
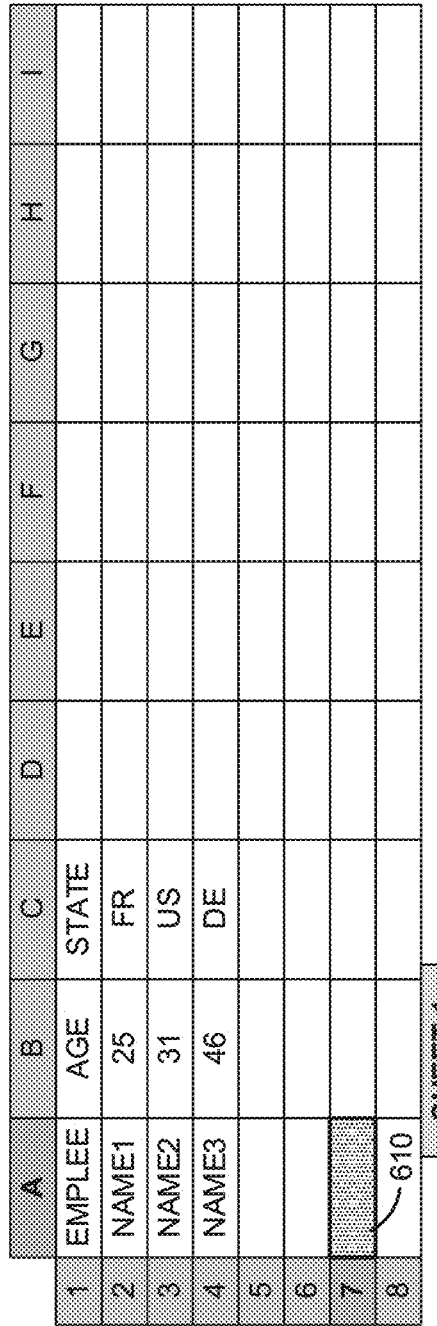
FIG. 6 illustrates a spreadsheet instance after writing in data, according to one embodiment.

In one embodiment, the function (e.g., function "Push Values On Row") provides an additional parameter to further offset the position of the active cell after entering the submitted data. For example, the calls of the function may be as follows:

First call: ["Emplee", "Age", "State"], 0;
Second call: ["Name1", 25, "FR"], 0;
Third call: [["Name2", 31, "US"], ["Name3",46, "DE"]], 2;

In the example, the offset parameter is different from zero only for the third call, instructing the function ("Push Values On Row") to leave two blank rows between the last data entry and the new position of the active cell, according to one embodiment. FIG. 6 illustrates spreadsheet instance 600 that represents spreadsheet instance 400 of FIG. 4 after writhing in the data submitted with the latter exemplary calls of the function ("Push Values On Row"). Accordingly, the currently active cell 610 in spreadsheet instance 600 is positioned at A7.

Figure 7:
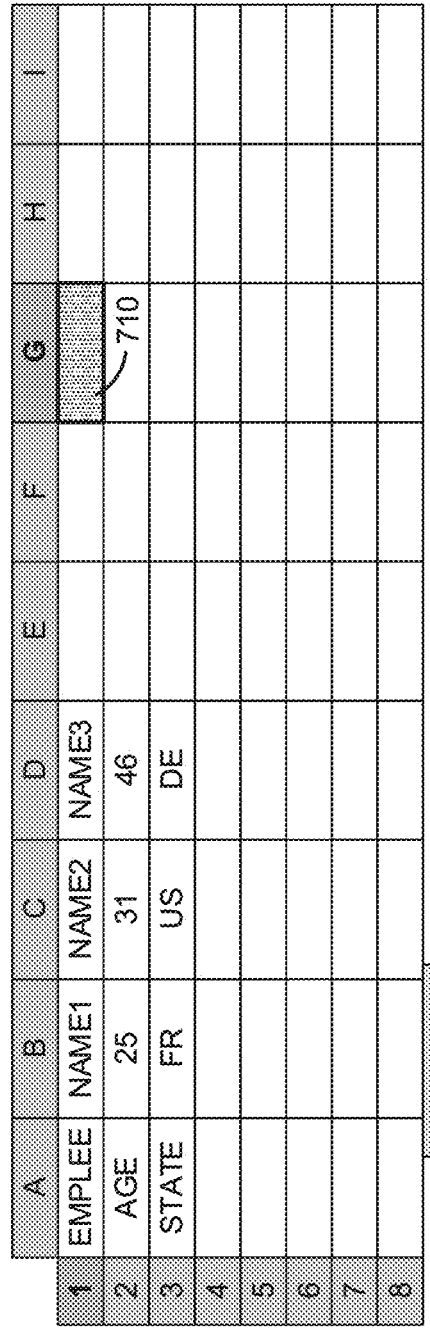
FIG. 7 illustrates a spreadsheet instance after writing in data, according to one embodiment.

FIG. 7 shows spreadsheet instance 700 that represents spreadsheet instance 400 of FIG. 4 after writhing in the same data, submitted by calling a function with an alternative implementation of process 300 (as illustrated in FIG. 3), according to one embodiment. This function, named for example "Push Values On Column", may writhe the provided values in corresponding cells of a same column per call (or set of columns in case of a matrix), instead of a same row (e.g., as function "Push Values On Row" does). The result of calling the function "Push Values On Column" using the arguments provided with the latter example is illustrated in FIG. 7, according to one embodiment. This result represents a transposition of the data compared to the result illustrated in FIG. 6. Accordingly, the new position of the active cell 710 in spreadsheet instance 700 is G1, leaving two blank columns, e.g., as instructed by the offset parameter of the third call.

In one embodiment, a function combining the functionalities of "Push Values On Row" and "Push Values On Columns" may be implemented (e.g., called "Push Values"). For example, the combined function may be executed in either "On Row" or "On Column" mode, e.g., defined by a parameter. Further, the two described functions may be used interchangeably, e.g., by accordingly structuring the submitted parameters (e.g., the data). The execution mode or the choice between the functions (e.g., "On Row" or "On Column") may depend on the data structure and/or on the positioning of the active cell. In one embodiment, this may determine the direction of adding subsequent data. Either way, the separate storing and managing of positions of cells in the spreadsheets is avoided. As a result, this may significantly simplify the RPA flows involving spreadsheet applications.

Figure 8:
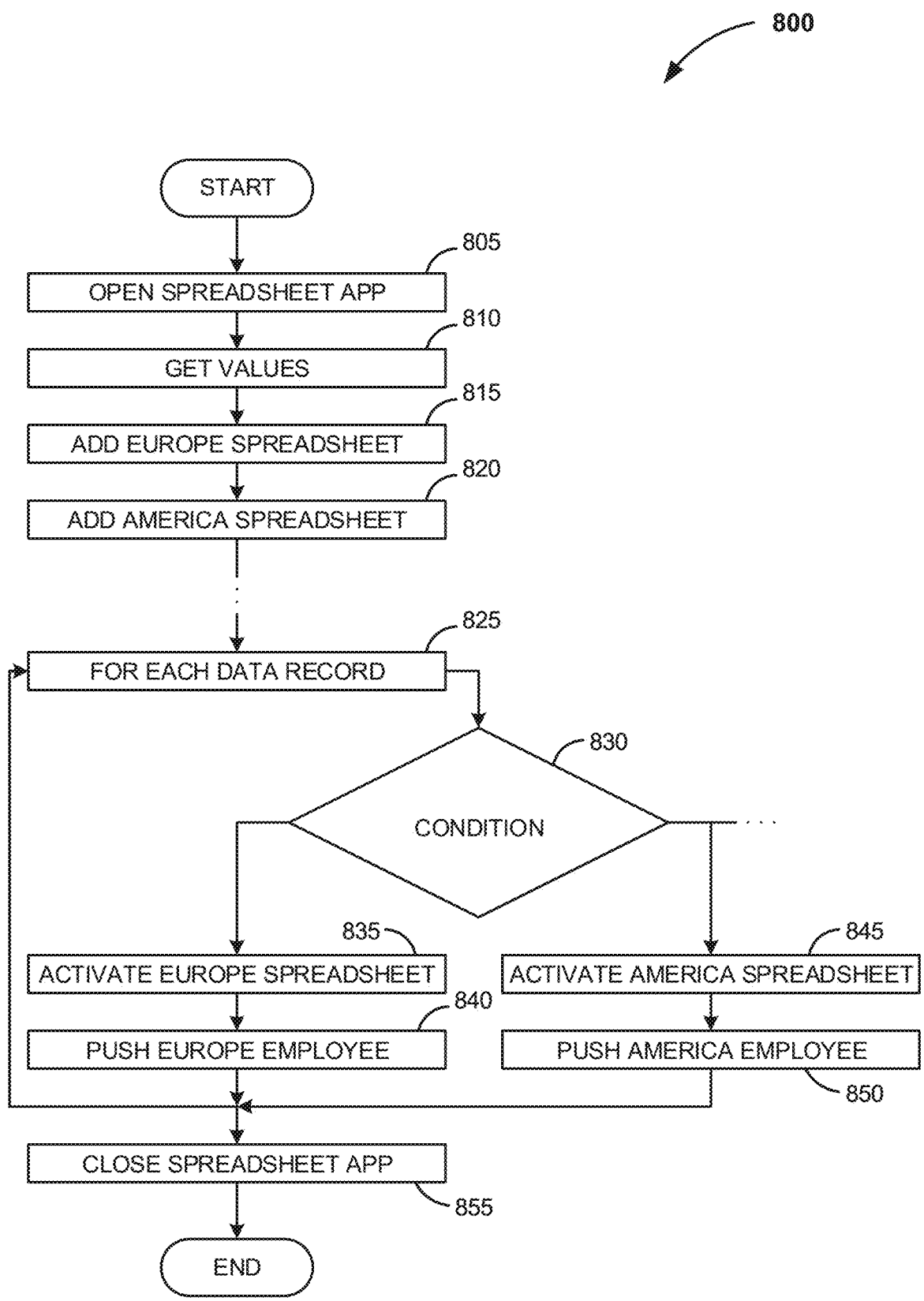
FIG. 8 is a flow diagram illustrating automation to push values in different spreadsheet instances, according to one embodiment.

For example, a user may want to automate a process of distributing data based on predefined criteria between different spreadsheet instances, e.g., within the same spreadsheet file. For illustration, the user may want to split the data entered in spreadsheet instance 500 of FIG. 5 in a few separate spreadsheet instances based on the continents where the countries of the employees ("emplee") are situated. FIG. 8 shows automation flow 800 that may be defined to perform the desired task, according to one embodiment. The different elements of automation flow 800 may correspond to functions available of an RPA system design environment (e.g., design studio). When compiled, automation flow may be executed as designed at a computer system, e.g., by an RPA agent.

Automation flow 800 may start at 805 with opening an instance of a spreadsheet application. In one embodiment, the spreadsheet application is installed at a computer system where the automation flow will be executed. The connection between the respective RPA agent and the spreadsheet application may be configured at installation or/and during the deployment of the compiled automation flow 800. For example, at 805, the RPA agent may start the spreadsheet application and load the spreadsheet instance 500. The values written in the loaded spreadsheet instance (e.g., 500) may be read at 810.

In one embodiment, automation flow 800 continues with adding a separate spreadsheet instance for each continent pertinent to the task (e.g., 815, 820, . . . ). In one embodiment, the different spreadsheet instances may be added as separate sheets of the same spreadsheet file, e.g., the spreadsheet file of spreadsheet instance 500. Each spreadsheet instance may be a separate sheet of the file. Alternatively, each spreadsheet instance corresponding to a continent may be in a separate spreadsheet file.

At 825, a loop starts for each record of the data as read at 810. Each record of the data may correspond to a separate employee. Accordingly, for one employee at a time, condition 830 verifies what is the continent associated with the employee, based on the country of the employee provided in the corresponding "state" field. Once the continent is identified (at 830), the respective spreadsheet instance is activated (e.g., at 835, 845, . . . ), and the employee record is pushed in the spreadsheet instance (e.g., at 840, 850, . . . ), according to one embodiment. After the extracted employee records are written in a corresponding spreadsheet instances, the spreadsheet application instance is released (at 855, e.g., the application is closed) and the execution of the automation flow ends.

The employee records may be pushed by rows or by columns. Either way, the functions corresponding to blocks 840, 850, . . . , may implement process 300 as shown in FIG. 3, according to one embodiment. Thus, automation flow 800 of FIG. 8 may not need to store and maintain information about relevant cells positions for the different spreadsheet instances. The implementation of process 300 ensures that each entry in a spreadsheet instance will be at the right position. The maintenance of cells positions per spreadsheet instances in an automation flow, as conventional approaches would require, significantly increases the complexity of such RPA automations. An additional challenge for creating automation flows using conventional functions (e.g., APIs) is the management of relevant cells positions for reopening spreadsheet instances.

Figure 9:
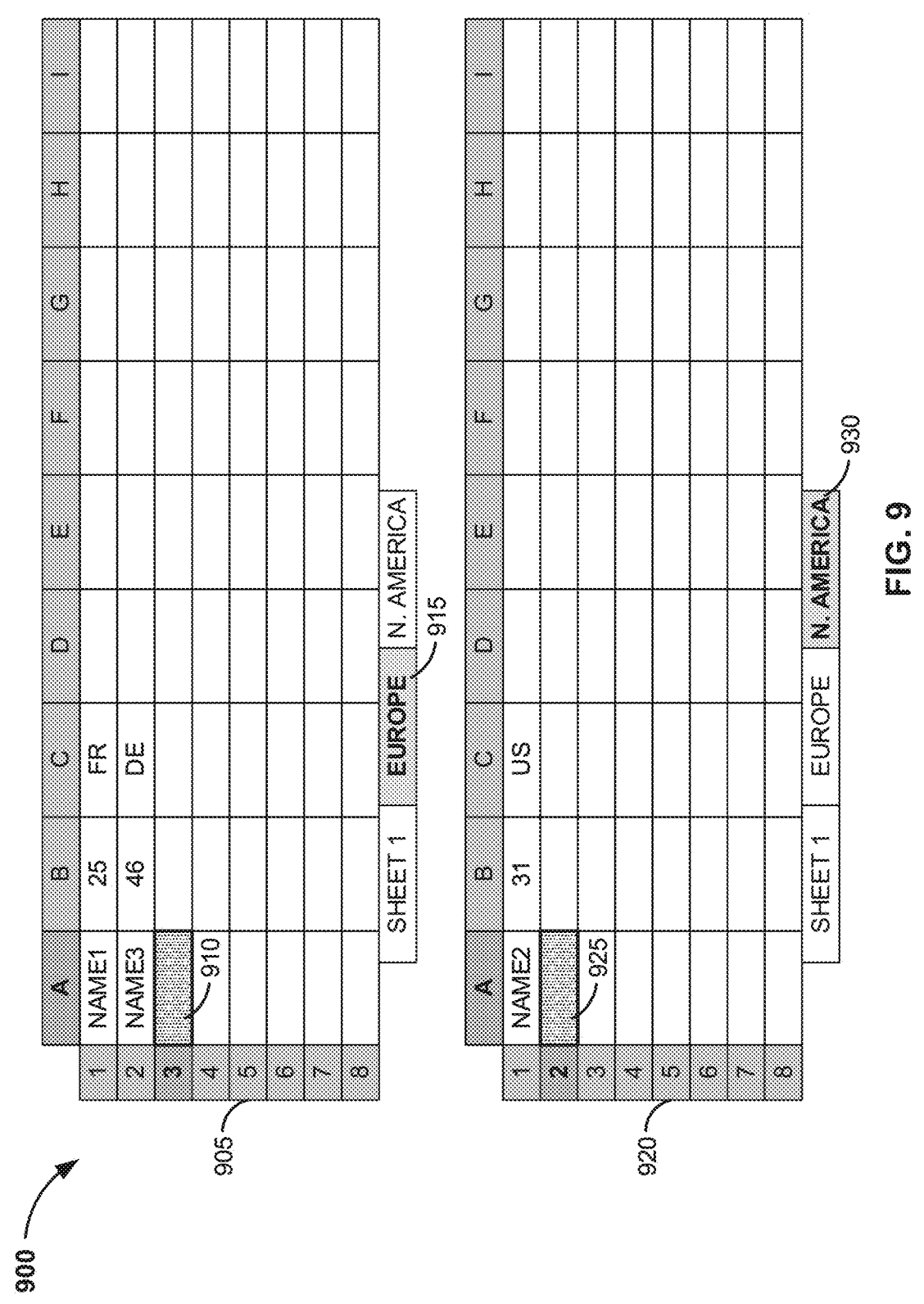

FIG. 9 illustrates spreadsheet instances 905 and 920 of spreadsheet 900, corresponding to continents Europe and N. America (North America), respectively, as tabs 915 and 930 indicate. The data for the employees in spreadsheet instance 500 of FIG. 5 may be distributed by automation flow 800 of FIG. 8 between spreadsheet instance 905 and spreadsheet instance 920, e.g., based on the country in the "state" field of the different employee records. Thus, the records of employee "Name1" from France and employee "Name2" from Germany are written in spreadsheet instance 905 corresponding to Europe. Likewise, the record of employee "Name2" from the USA is placed in spreadsheet instance 920 for continent N. America.

In one embodiment, active cells 910 and 925 in corresponding spreadsheet instances 905 and 920 may be selected as a result of the execution of functions 840 and 850 of automation flow 800 in FIG. 8. Thus, a function implementing process 300 in FIG. 3 (e.g., 840, 850) may write a next employee record in a corresponding spreadsheet instance right after the last record written in the same spreadsheet instance, without needing any positioning information. The next record in spreadsheet instance 905 will begin at A3, while the next record in spreadsheet instance 920 will begin at A2. It would not matter whether the next record will be added during the execution of the same automation flow, or by a subsequent automation flow, e.g., after re-instantiating of the spreadsheet application and/or reopening of the spreadsheet file.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be set in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
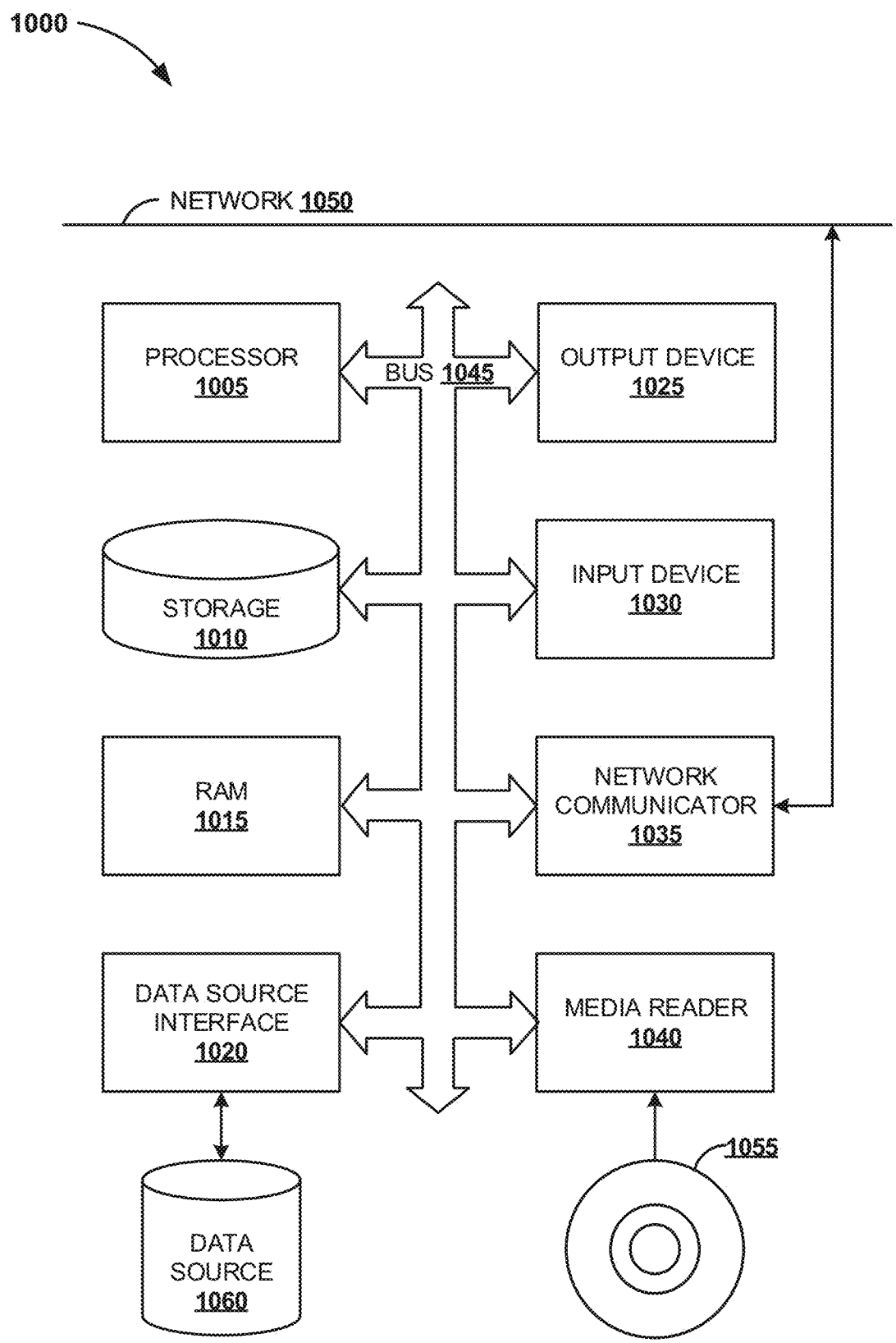
FIG. 10 is a block diagram of an exemplary computer system to execute computer readable instructions to smart push values in spreadsheets, according to one embodiment.

FIG. 10 is a block diagram of an exemplary computer system 1000. The computer system 1000 includes a processor 1005 that executes software instructions or code stored on a computer readable storage medium 1055 to perform the above-illustrated methods. The computer system 1000 includes a media reader 1040 to read the instructions from the computer readable storage medium 1055 and store the instructions in storage 1010 or in random access memory (RAM) 1015. The storage 1010 may provide space for keeping data where at least some instructions could be stored for later execution. The stored instructions may be further compiled to generate other representations of the instructions and dynamically stored in the RAM 1015. The processor 1005 may read instructions from the RAM 1015 and perform actions as instructed. According to one embodiment, the computer system 1000 further includes an output device 1025 (e.g., a display) to provide at least some of the results of the execution as output including, but not limited to, visual information to users, and an input device 1030 to provide a user or another device with means for entering data and/or otherwise interact with the computer system 1000. These output devices 1025 and input devices 1030 could be joined by one or more additional peripherals to further expand the capabilities of the computer system 1000. A network communicator 1035 may be provided to connect the computer system 1000 to a network 1050, and in turn, to other devices connected to network 1050 including, e.g., other clients, servers, data stores, and interfaces. The modules of the computer system 1000 are interconnected via bus 1045. Computer system 1000 includes data source interface 1020 to access data source 1060. The data source 1060 can be accessed via one or more abstraction layers implemented in hardware or software. For example, the data source 1060 may be accessed via network 1050. In some embodiments, the data source 1060 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A system to write data in a spreadsheet instance by a process automation, comprising:
    at least one operative memory device to store instructions; and
    at least one processor coupled to the at least one operative memory device to execute the instructions to instantiate a process automation agent coupled to a spreadsheet application, wherein, the process automation agent to:
        access an array of data,
        calculate a size of the array of data, the size being based at least partially on a type of each individual value of the data of the array of data, wherein the data of the array of data includes at least two different types of values,
        trigger determining a position of an active cell in the spreadsheet instance,
        determine whether to write values of the data of the array to separate cells in a particular row or to write the values of the data of the array to the separate cells in a particular column based on the calculated size of the array of data,
        trigger writing a value of the data in a cell at the position of the active cell in the particular row or in the particular column as determined,
        calculate a new position of the active cell, and
        trigger setting the cell at the calculated new position as a new active cell.

2. The system of claim 1, further comprising:
    the automation agent to determine a size of the data, wherein the size of the data defines a structure of at least one value and at least one dimension of the data.

3. The system of claim 2, further comprising:
    the automation agent to trigger writing a subsequent value of the data in a cell at a position relative to the position of the active cell as determined.

4. The system of claim 3, further comprising:
    the automation agent to calculate the position relative to the position of the active cell based on the size of the data as determined.

5. The system of claim 4, wherein the calculating of the position relative to the position of the active cell comprises determining the orientation of the at least one dimension of the data.

6. The system of claim 4, wherein the calculating of the position relative to the position of the active cell is based on a parameter.

7. The system of claim 2, wherein the calculating of the new position of the active cell is based on the size of the data as determined.

8. The system of claim 7, wherein the calculating of the new position of the active cell is based further on an offset parameter.

9. A non-transitory machine-readable medium to store instructions, which when executed by a computer, cause the computer to perform operations comprising:
    accessing an array of data;
    calculating a size of the array of data, the size being based at least partially on a type of each individual value of the data of the array of data, wherein the data of the array of data includes at least two different types of values;
    determining a position of an active cell in a spreadsheet instance;
    determining whether to write values of the data of the array to separate cells in a particular row or to write the values of the data of the array to the separate cells in a particular column based on the calculated size of the array of data;

writing a value of an input data in a cell at the position of the active cell in the particular row or in the particular column as determined;

calculating a new position of the active cell; and setting the cell at the calculated new position as a new active cell.

10. The machine-readable medium of claim 9, to store instructions, which when executed by the computer, cause the compute to perform operations further comprising:

determining, by the automation agent, a size of the data, wherein the size of the data defines a structure of at least one value and at least one dimension of the data.

11. The machine-readable medium of claim 10, to store instructions, which when executed by the computer, cause the compute to perform operations further comprising:

writing a subsequent value of the data in a cell at a position relative to the position of the active cell as determined.

12. The machine-readable medium of claim 11, to store instructions, which when executed by the computer, cause the compute to perform operations further comprising:

calculating the position relative to the position of the active cell based on an orientation of the at least one dimension of the data.

13. The machine-readable medium of claim 10, wherein the calculating of the new position of the active cell is based on the size of the data as determined.

14. A method to write data in a spreadsheet instance by a process automation, comprising:

accessing an array of data;

calculating a size of the array of data, the size being based at least partially on a type of each individual value of the data of the array of data, wherein the data of the array of data includes at least two different types of values;

determining a position of an active cell in the spreadsheet instance;

determining whether to write values of the data of the array to separate cells in a particular row or to write the values of the data of the array to the separate cells in a particular column based on the calculated size of the array of data;

writing a value of the data in a cell at the position of the active cell in the particular row or in the particular column as determined;

calculating, by a process automation agent, a new position of the active cell; and setting the cell at the calculated new position as a new active cell.

15. The method of claim 14, further comprising:

determining, by the automation agent, a size of the data, wherein the size of the data defines a structure of at least one value and at least one dimension of the data.

16. The method of claim 15, further comprising:

writing a subsequent value of the data in a cell at a position relative to the position of the active cell as determined.

17. The method of claim 16, further comprising:

calculating the position relative to the position of the active cell based on the size of the data as determined.

18. The method of claim 16, further comprising:

calculating the position relative to the position of the active cell based on a parameter indicative for an orientation of the at least one dimension of the data.

19. The method of claim 15, wherein the calculating of the new position of the active cell is based on the size of the data as determined.

20. The method of claim 19, wherein the calculating of the new position of the active cell is based further on an offset parameter.

* * * * *